United States Patent
Kuwayama et al.

(10) Patent No.: US 8,864,611 B2
(45) Date of Patent: Oct. 21, 2014

(54) FRONT DERAILLEUR

(71) Applicant: Shimano Inc., Osaka (JP)

(72) Inventors: Kazuya Kuwayama, Osaka (JP);
Atsuhiro Emura, Osaka (JP); Kenkichi Inoue, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 13/705,393

(22) Filed: Dec. 5, 2012

(65) Prior Publication Data
US 2014/0155205 A1    Jun. 5, 2014

(51) Int. Cl.
*F16H 9/00*    (2006.01)
*F16H 59/00*   (2006.01)
*F16H 61/00*   (2006.01)
*F16H 63/00*   (2006.01)
*B62M 9/135*   (2010.01)

(52) U.S. Cl.
CPC .................... *B62M 9/135* (2013.01)
USPC ............................. 474/80; 474/82

(58) Field of Classification Search
CPC ...... B62M 9/132; B62M 9/135; B62M 9/136; B62M 9/137; B62M 25/08
USPC ..................................... 474/80, 82
See application file for complete search history.

(56) References Cited

U.S. PATENT DOCUMENTS

| | | | | |
|---|---|---|---|---|
| 4,199,997 A * | 4/1980 | Isobe | | 474/82 |
| 4,199,998 A * | 4/1980 | Isobe | | 474/82 |
| 4,503,737 A * | 3/1985 | DiGiovanni | | 81/436 |
| 4,675,952 A * | 6/1987 | Nagano | | 24/483 |
| 6,162,140 A * | 12/2000 | Fukuda | | 474/70 |
| 6,270,124 B1 * | 8/2001 | Nanko | | 285/15 |
| 6,843,741 B2 * | 1/2005 | Fujii | | 474/70 |
| 6,945,888 B2 * | 9/2005 | Fukuda et al. | | 474/70 |
| 6,979,009 B2 * | 12/2005 | Ichida et al. | | 280/238 |
| 7,291,079 B2 * | 11/2007 | Ichida et al. | | 474/80 |
| 7,306,531 B2 * | 12/2007 | Ichida et al. | | 474/70 |
| 7,331,890 B2 * | 2/2008 | Ichida et al. | | 474/80 |
| 7,341,532 B2 * | 3/2008 | Ichida et al. | | 474/70 |
| 7,442,136 B2 * | 10/2008 | Ichida et al. | | 474/82 |
| 7,704,172 B2 * | 4/2010 | Tetsuka et al. | | 474/80 |
| 7,704,173 B2 * | 4/2010 | Ichida et al. | | 474/82 |
| 7,722,487 B2 * | 5/2010 | Ichida et al. | | 474/80 |
| 7,789,351 B2 * | 9/2010 | Auer | | 248/74.3 |
| 7,922,612 B2 * | 4/2011 | Yoshida et al. | | 474/80 |
| 7,963,871 B2 * | 6/2011 | Peh et al. | | 474/82 |
| 8,241,158 B2 * | 8/2012 | Ishikawa | | 474/80 |
| 8,574,105 B2 * | 11/2013 | Auer | | 474/82 |
| 2004/0185975 A1 * | 9/2004 | Chen | | 474/80 |
| 2005/0192139 A1 * | 9/2005 | Ichida et al. | | 474/80 |
| 2005/0197222 A1 * | 9/2005 | Tatsumi | | 474/80 |
| 2005/0204846 A1 * | 9/2005 | Valle et al. | | 74/469 |
| 2005/0205323 A1 * | 9/2005 | Ichida et al. | | 180/205 |
| 2006/0189421 A1 * | 8/2006 | Ichida et al. | | 474/80 |
| 2007/0037645 A1 * | 2/2007 | Ishikawa | | 474/80 |
| 2007/0117666 A1 * | 5/2007 | Ichida et al. | | 474/80 |
| 2007/0184925 A1 * | 8/2007 | Ichida et al. | | 474/80 |
| 2008/0132364 A1 * | 6/2008 | Ichida et al. | | 474/70 |
| 2012/0295745 A1 * | 11/2012 | Emura et al. | | 474/80 |

* cited by examiner

*Primary Examiner* — Henry Liu
(74) *Attorney, Agent, or Firm* — Global IP Counselors

(57) ABSTRACT

A front derailleur basically includes a fixed member, a main body, a movable member and a support member. The fixing member is configured to be fixed to a bicycle frame. The main body is attached to the fixing member. The movable member is movably supported to the main body with respect to the fixing member. The support member is movably attached to one of the fixing member and the main body. The support member including an operated portion selectively operated by an operating element and positioned between the fixing member and the main body.

22 Claims, 9 Drawing Sheets

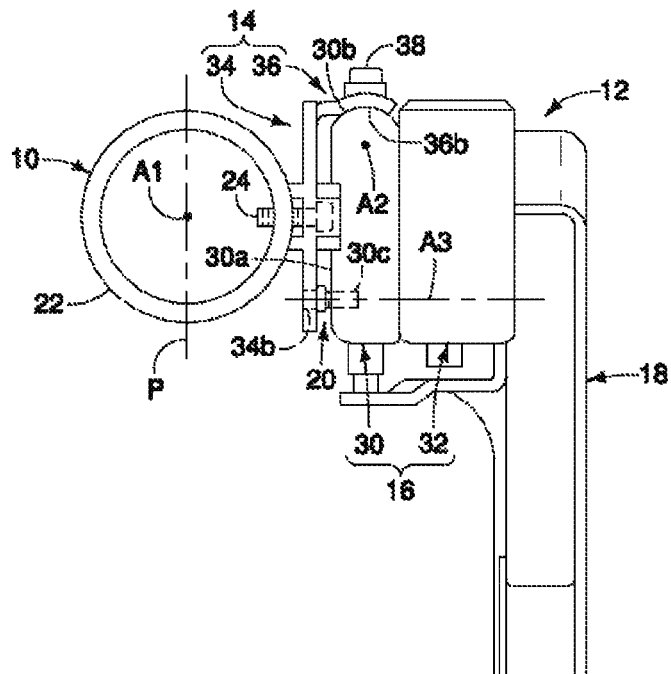
FIG. 4
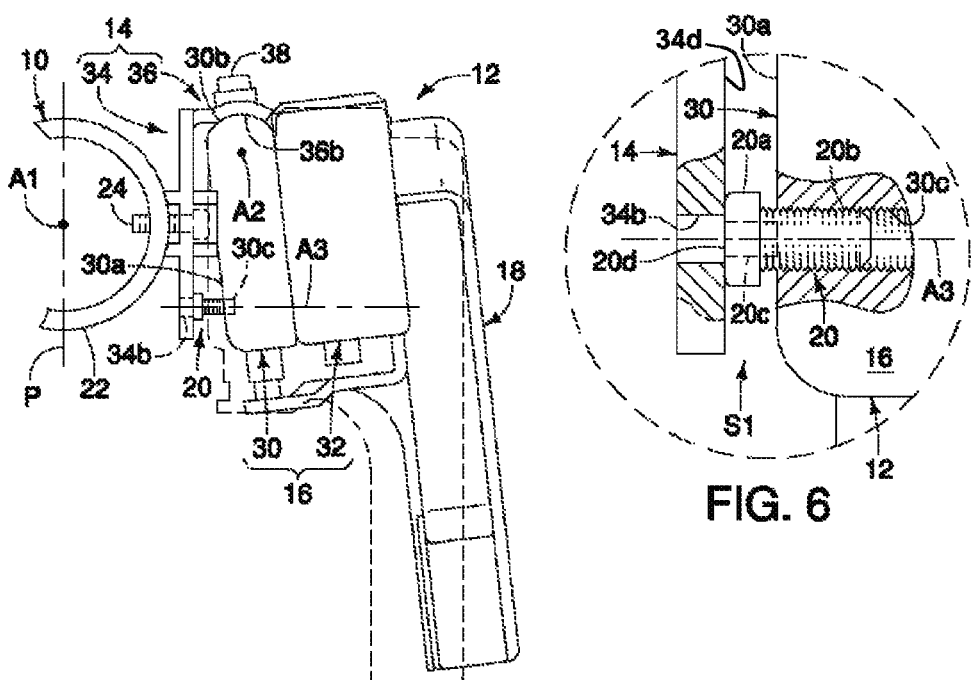
FIG. 5
FIG. 6

FRONT DERAILLEUR

BACKGROUND

1. Field of the Invention

This invention generally relates to a front derailleur that is fastened to the bicycle frame. More specifically, the present invention relates to a front derailleur having a support member for mounting the front derailleur to a bicycle frame in a manner such that the angular position of the front derailleur can be finely adjusted relative to the bicycle frame.

2. Background Information

Generally, a front derailleur is mounted to the bicycle frame adjacent to the front chain rings to shift a chain laterally between the front chain rings. A front derailleur includes a fixed or base member that is non-movably secured to the bicycle frame. A front derailleur further includes a movable member or chain guide that is movably supported relative to the fixed member such that the chain guide moves between at least two lateral shift positions to shift the chain between the front chain rings. Typically, a linkage assembly is coupled between the fixed member and the chain guide in order to movably support the chain guide. The chain guide typically has a pair of cage plates or guide plates arranged to selectively contact and move the chain between the front chain rings. The cage plates or guide plates form lateral sides of a chain cage portion of the chain guide.

A front derailleur is sometimes attached to the seat tube (tubular member) of the bicycle frame by a mounting fixture, which is fastened by being welded or screwed to the seat tube of the frame. This mounting fixture is sometimes called a direct-mount type of a mounting fixture. Since such mounting fixtures are fastened to the seat tube before attaching the front derailleur to the frame, the orientation of the chain guide of the front derailleur is determined based on the mounting position of the mounting fixture. As a result, sometimes the chain guide or movable member of the derailleur will not be disposed in a parallel position directly above the front chain rings.

SUMMARY

Generally, the present disclosure is directed to a front derailleur. In one feature, a front derailleur is configured to be adjustably arranged so that the movable member of the derailleur can be disposed in a parallel position directly above the front chain rings.

In view of the state of the known technology, a front derailleur unit is provided that basically comprises a fixed member, a main body, a movable member and a support member. The fixing member is configured to be fixed to a bicycle frame. The main body is attached to the fixing member. The movable member is movably supported to the main body with respect to the fixing member. The support member is movably attached to one of the fixing member and the main body. The support member including an operated portion selectively operated by an operating element and positioned between the fixing member and the main body.

Other objects, features, aspects and advantages of the disclosed front derailleur will become apparent to those skilled in the art from the following detailed description, which, taken in conjunction with the annexed drawings, discloses preferred embodiments of the front derailleur.

BRIEF DESCRIPTION OF THE DRAWINGS

Referring now to the attached drawings which form a part of this original disclosure:

FIG. 4 is a top plan view of the bicycle frame and the front derailleur illustrated in FIGS. 1 to 3 with the front derailleur in a first position;

FIG. 5 is a top plan view of the bicycle frame and the front derailleur illustrated in FIGS. 1 to 3 with the front derailleur in a second position;

FIG. 6 is a partial top plan view of a portion of the support member and a portion of the main body of the front derailleur illustrated in FIGS. 1 to 5 with areas broken away for purposes of illustration;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
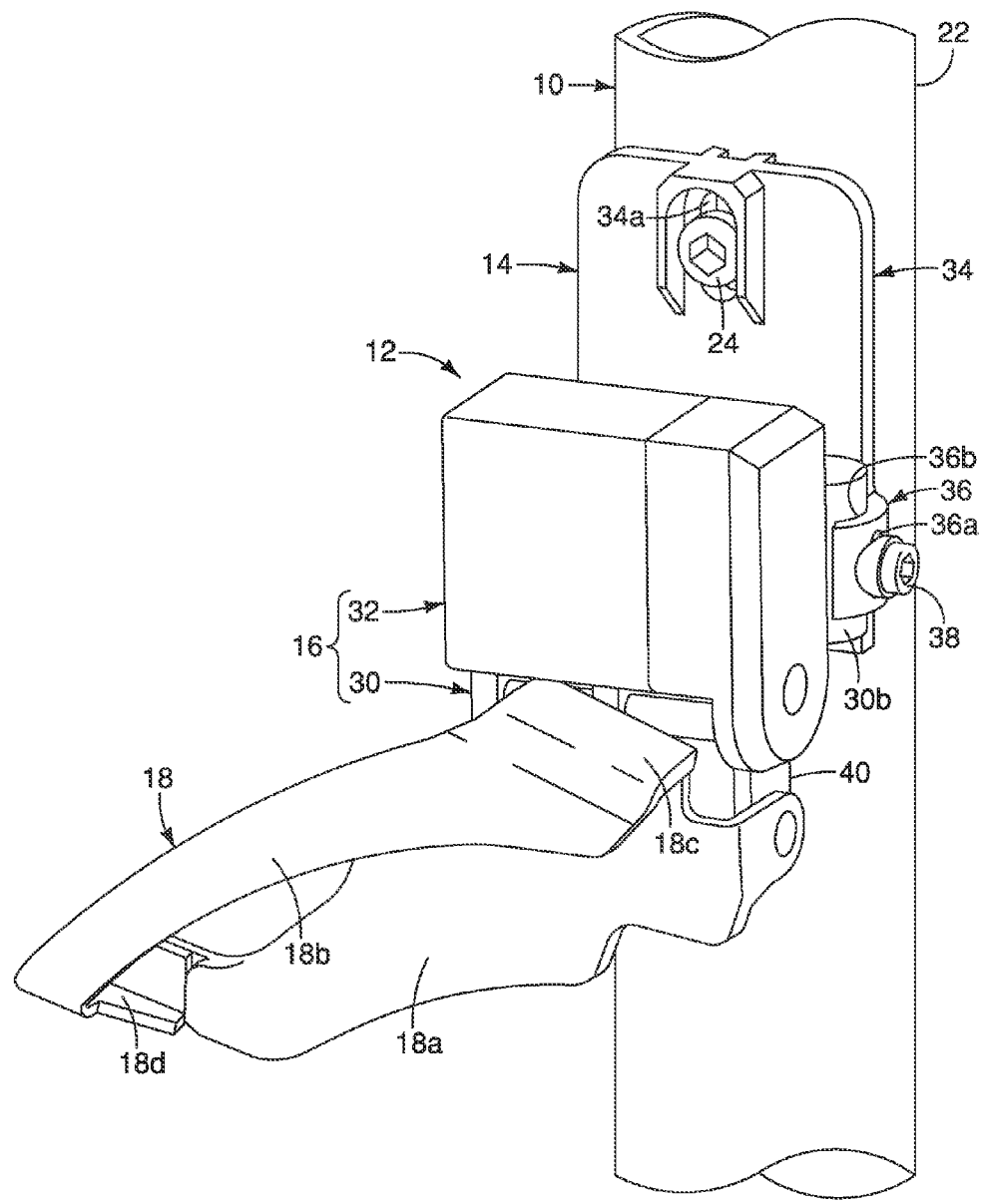
FIG. 1 is a partial side perspective view of a bicycle frame having a front derailleur mounted to the frame in accordance with a first embodiment.
Figure 2:
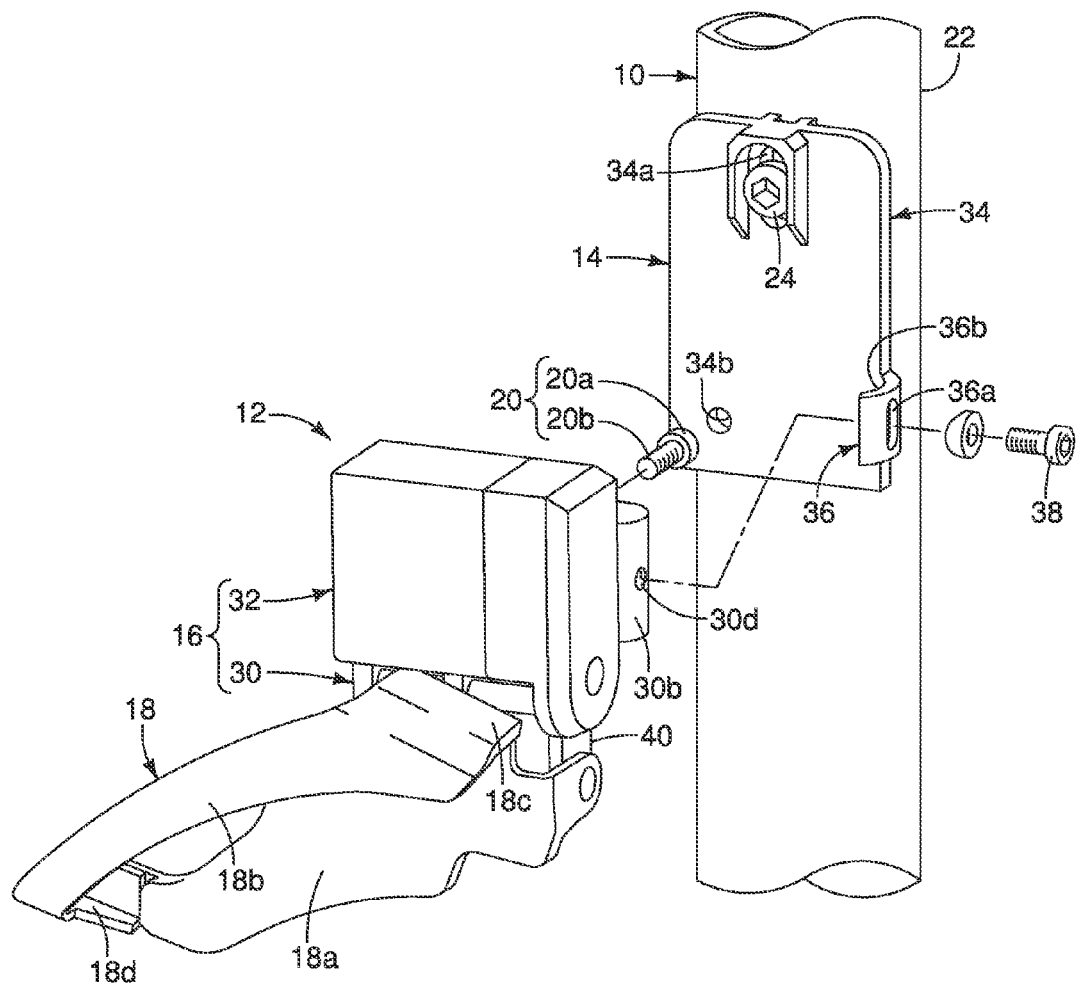
FIG. 2 is an exploded perspective view of the bicycle frame and the front derailleur illustrated in FIG. 1.
Figure 3:
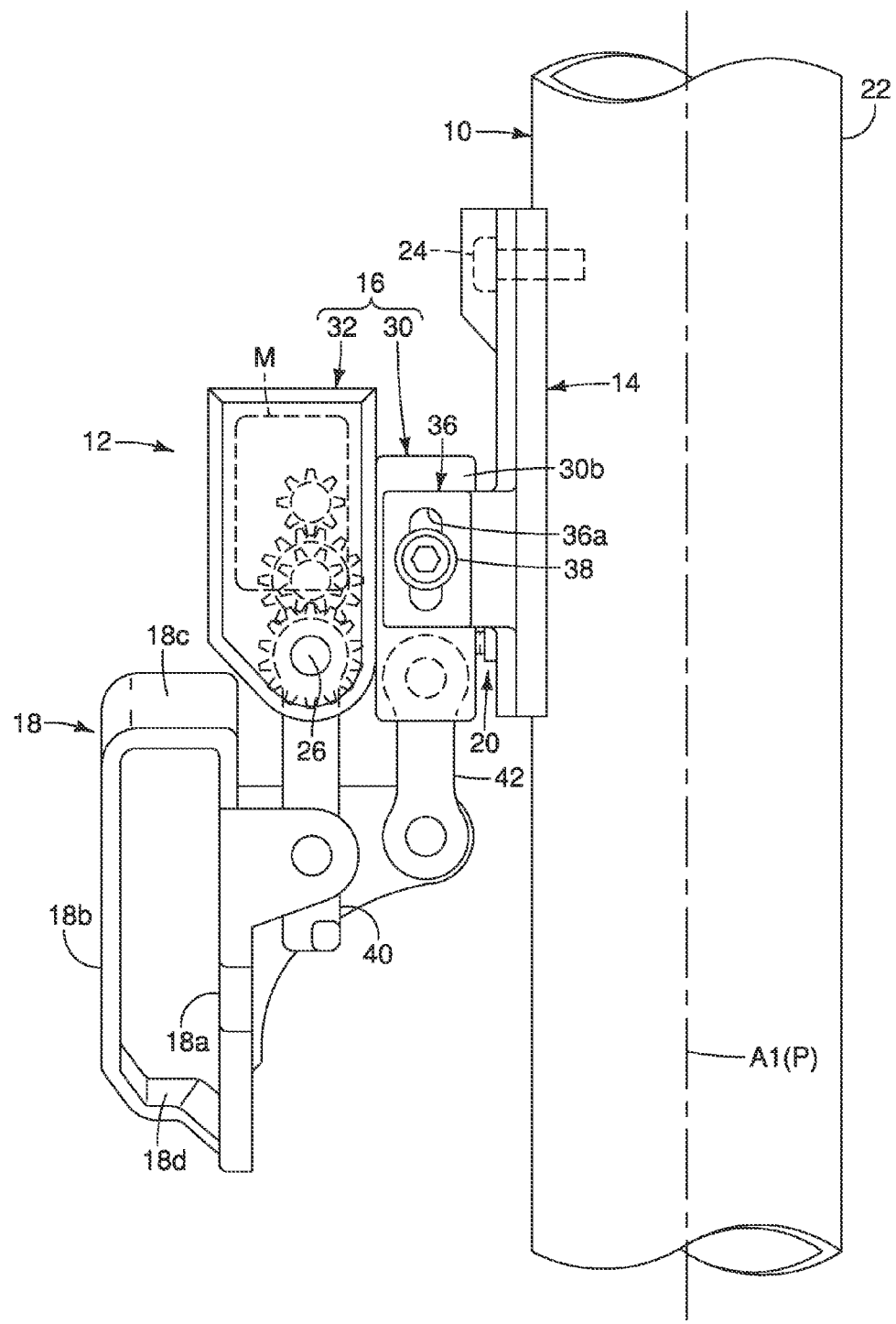
FIG. 3 is a front elevational view of the bicycle frame and the front derailleur illustrated in FIGS. 1 and 2.

Referring initially to FIGS. 1 to 6, a portion of a bicycle frame 10 is illustrated with a front derailleur 12 in accordance with a first embodiment. The front derailleur 12 basically includes a fixing member 14, a main body 16, a movable member 18 (e.g., a chain guide) and a support member 20 (FIG. 2). As seen in FIG. 1, the fixing member 14 is configured to be directly fixed to a seat tube 22 of the bicycle frame 10 by a frame fastener 24 (e.g., a bolt). The seat tube 22 has a center longitudinal axis A1, which lies in a center plane P of the bicycle frame 10 (FIG. 3). The front derailleur 12 is fasten to the seat tube 22 of the bicycle frame 10 using the fixing member 14 and the support member 20 so that adjustment is possible in a vertical or height direction and so that fine adjustment is also possible about a first adjustment axis A2 (FIG. 4), which is parallel to the center longitudinal axis A1 of the seat tube 22 and is disposed at a distance from the seat tube 22.

As explained below, the support member 20 is arranged between the fixing member 14 and the main body 16. The support member 20 is movably attached to one of the fixing member 14 and the main body 16 to adjustably support the main body 16 relative to the fixing member 14 about the adjustment axis A2. In particular, in the first embodiment, the support member 20 is movably attached to the main body 16 to adjustably support the main body 16 relative to the fixing member 14 about the adjustment axis A2. Alternatively, the support member 20 can be movably attached to the fixing member 14 to adjustably support the main body 16 relative to the fixing member 14 about the adjustment axis 82. The main body 16 moves relative to the fixing member 14 about the adjustment axis A2 upon adjustment of the support member 20 to change an angular position of the main body 16 relative to the center plane P of the bicycle frame 10. More specifically, the support member 20 presses the fixing member 14 to adjust an angular position of the main body 16 relative the center plane P of the bicycle frame 10.

Here, in the first illustrated embodiment, the front derailleur 12 is an electric front derailleur, which is designed to be used with a bicycle that has three front chain rings or sprockets. Thus, the movable member 18 shifts a chain laterally with respect to the bicycle frame 10 between three gear positions. Basically, the movable member 18 includes an inner plate 18a, an outer plate 18b, a top connecting member 18c and a bottom connecting member 18d. The inner plate 18a and the outer plate 18b are laterally spaced apart and connected to each other at upper portions by the top connecting member 18c and connected to each other at lower portions by the bottom connecting member 18d to define a chain cage portion 28. The inner plate 18a pushes a chain up onto a larger chain ring during an upshift operation. The outer plate 18b pulls a chain inward onto a smaller chain ring during a downshift operation.

Referring to FIG. 3, the main body 16 includes a base member 30 that is fixed to the bicycle frame 10 and an electric motor unit 32 that is fixed to the base member 30. The motor unit 32 has a reversible electric motor M that is electrically connected to a remote power supply such as a battery (not shown) and/or a generator (not shown) via an electrical cord (not shown). Alternatively, the motor unit 32 can be provided with a rechargeable battery (not shown). The movable member 18 is moved laterally by operation of the motor M. In particular, the motor unit 32 includes a gear reduction unit (not shown) that is provided between the motor M and an output shaft 26.

As seen in FIG. 3, the movable member 18 is movably supported to the base member 30 of the main body 16 by an outer link 40 and an inner link 42 for lateral movement of the chain guide portion 28 with respect to the main body 16. The outer link 40 has a first end that is fixed to the output shaft 26 for pivoting the outer link 40 relative to the base member 30. The outer link 40 has a second end that is pivotally mounted to the movable member 18. The inner link 42 has a first end pivotally connected to the base member 30 and a second end pivotally mounted to the movable member 18. Thus, the outer and inner links 40 and 42 define a four bar linkage that operatively connects the movable member 18 to the base member 30. As mentioned above, the front derailleur unit 14 is designed to be used with a bicycle that has three front chain rings. Thus, the movable member 18 is movable with respect to the base member 30 between three gear positions (i.e., a first end position, an intermediate or middle position and a second end position). While the front derailleur 12 is illustrated as an electric front derailleur, the outer and inner links 40 and 42 can be moved by a cable with some minor modifications. In other words, it will be apparent to those skilled in the art from this disclosure that the motor unit 32 of the front derailleur 12 can be replaced with a cable operated arrangement.

The output shaft 26 of the motor unit 32 is operatively coupled to the outer link 40 to move the movable member 18 with respect to the base member 30. In other words, the motor unit 32 is configured to move the movable member 18 with respect to the base member 30 based on the operation of the motor M. In particular, rotation of the output shaft 26 of the motor unit 32 drives the outer link 40 to move the movable member 18 relative to the base member 30. In performing a chain shifting operation, the motor M of the motor unit 32 is operated by a user operating device (not shown) to turn the output shaft 26 of the motor unit 32. Depending on the rotational direction of the output shaft 26, the motor M will either move the movable member 18 towards or away from the seat tube 22 of the bicycle frame 10.

As seen in FIGS. 1 to 3, the fixing member 14 constitutes a mounting fixture for supporting the front derailleur 12 on the seat tube 22. The fixing member 14 is a direct-mount type of a mounting fixture. Basically, the fixing member 14 includes a bicycle frame attachment portion 34 that can be fastened to the seat tube 22, and a front derailleur attachment portion 36. Here, the bicycle frame attachment portion 34 and the front derailleur attachment portion 36 are integrally formed as a one-piece, unitary member from a rigid material such as a stainless steel or the like, or a synthetic resin such as a fiber-reinforced resin or the like.

The bicycle frame attachment portion 34 of the fixing member 14 includes a frame fastener receiving hole 34a that receives the frame fastener 24 to selectively fix the fixing member 14 to the seat tube 22 of the bicycle frame 10. The frame fastener 24 is, for example, a bolt that is threaded into a hole of the seat tube 22. The frame fastener receiving hole 34a is preferably an elongated hole or elongated slot so that the fixing member 14 is adjustably fixed to the bicycle frame 10 in a direction parallel to the center longitudinal axis A1.

The front derailleur attachment portion 36 of the fixing member 14 includes a derailleur fastener receiving hole 36a that receives a derailleur fastener 38 (e.g., a boil) to releasably fixes the fixing member 14 to the main body 16. As explained below, the main body 16 is adjustably attached to the attachment portion 36 to adjust an angular position of the main body 16 relative to the center plane P of the bicycle frame 10. The derailleur fastener receiving hole 36a is preferably an elongated hole or elongated slot so that the front derailleur 12 is adjustably fixed to the fixing member 14 in a direction parallel to the center longitudinal axis A1 while the fixing member 14 is fixed to the bicycle frame 10.

The bicycle frame attachment portion 34 of the fixing member 14 also includes a tool access opening 34b that is configured so that a tool is capable of accessing the support member 20 therethrough. In other words, the tool access opening 34b is provided in the bicycle frame attachment portion 34 of the fixing member 14 for using a tool to access the support member 20 therethrough and adjust the angular position of the front derailleur 12 as discussed below.

As seen in FIGS. 4 to 6, the base member 30 of the main body 16 has a facing surface 30a that faces a facing surface 34d of the bicycle frame attachment portion 34 of the fixing member 14, and a curved surface 30b that is mounted to the front derailleur attachment portion 36 of the fixing member 14. The facing surface 30a is provided with a threaded hole 30c for adjustably supporting the support member 20 relative to the facing surface 30a of the base member 30. The curved surface 30b is provided with a threaded hole 30d for adjustably fixing the front derailleur attachment portion 36 thereto using the derailleur fastener 38. Thus, the base member 30 of the main body 16 is fixedly attached to the front derailleur attachment portion 36 of the fixing member 14 by the derailleur fastener 38.

The attachment portion 36 also includes a curved surface 36b that contacts a curved surface 30b of the main body 16. The curved surfaces 30b and 36b are centered substantially on the adjustment axis A2. Thus, the curved surfaces 30b and 36b define the adjustment axis A2 about which the main body 16 moves relative to the fixing member 14 upon adjustment of the support member 20. In the first illustrated embodiment, the support member 20 is arranged between the fixing member 14 and the base member 30 of the main body 16 to define a displacement axis A3 that is orthogonally relative to the adjustment axis A2 to adjust an angular position of the main body 16 about the adjustment axis A2. Thus, the angular orientation of the movable member 18 is adjustable with respect to the fixing member 14 about the fixing member 14.

As seen in FIG. 6, in the first illustrated embodiment, the support member 20 includes a head portion 20a and a shaft portion 20b. The head portion 20a defines the contact part, while the shaft portion 20b defines the threaded part. The contact part or head portion 20a contacts the fixing member 14 to apply a pressing force on the bicycle frame attachment portion 34 of the fixing member 14. The threaded part or shaft portion 20b is screwed into the threaded hole 30c of the facing surface 30a of the base member 30 to change the pressing force of the support member 20 against the bicycle frame attachment portion 34 of the fixing member 14. The contact part 20a of the support member 20 includes an operated portion 20c that is selectively operated by an operating element (e.g., a tool and/or a hand of a user). The operated portion 20c is positioned in a space S1 between the fixing member 14 and the main body 16. In this first embodiment, the operated portion 20c is formed on an axial end face 20d of the support member 20 as a blind bore or recess that is shaped to receive a hexagon wrench or other tool. Thus, in this first embodiment, the operated portion 20c constitutes a tool engagement surface of the support member 20.

The tool access opening 34b of the fixing member 14 is configured so that a tool is capable of accessing the support member 20 therethrough. The support member 20 only is adjustably accessible from the facing surface side 30a of the main body 16 via the tool access opening 34b. Thus, the tool (e.g., a hexagon wrench) is inserted through the tool access opening 34b to access the operated portion 20c of the support member 20. In particular, the tool access opening 34b is aligned with the operated portion 20c so that a tool can be inserted through the access opening 34b and into engagement with the operated portion 20c to rotate the support member 20.

Figure 7:
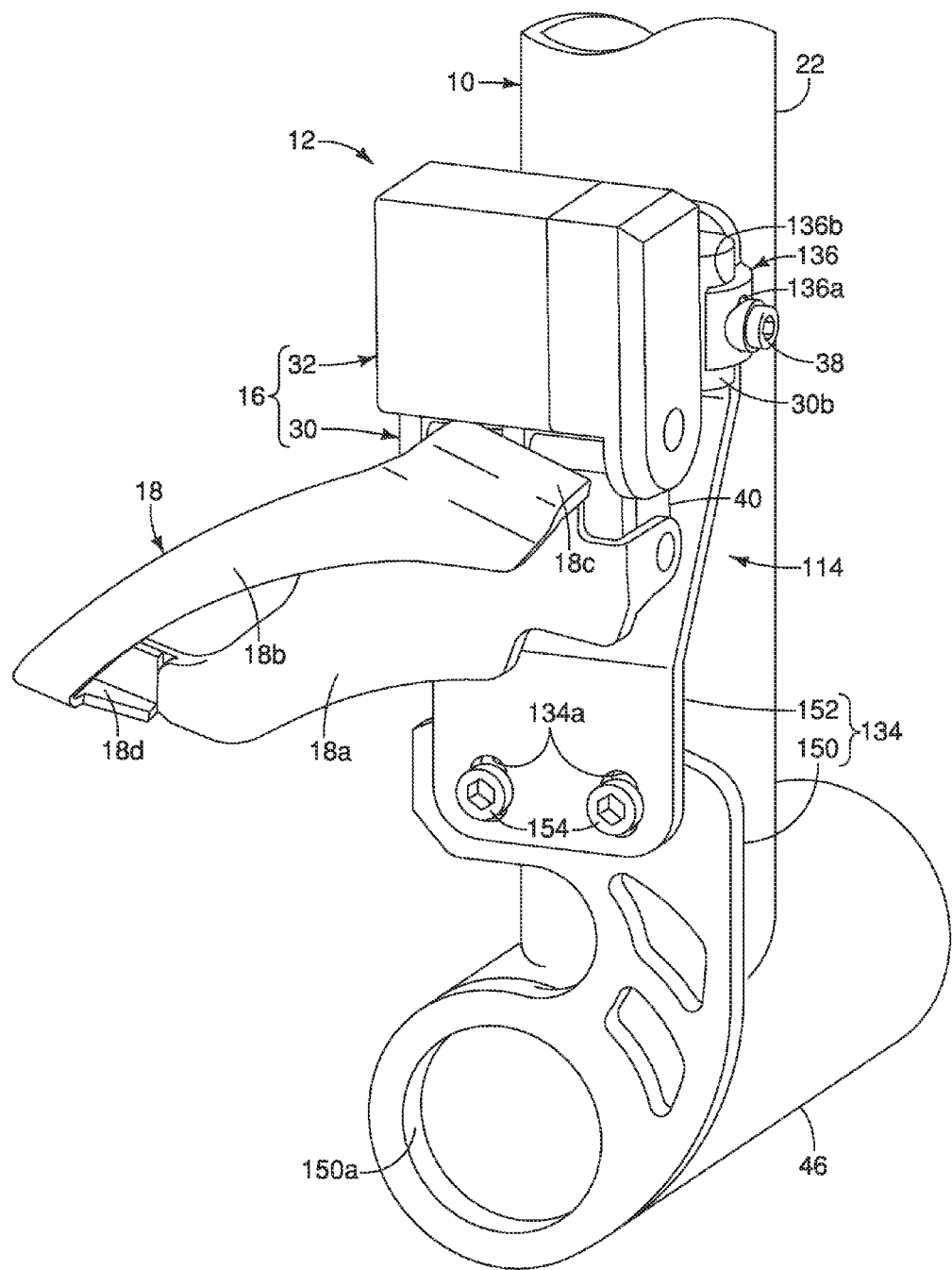
FIG. 7 is a partial side perspective view of a bicycle frame having the front derailleur mounted to the frame in accordance with a second embodiment.
Figure 8:
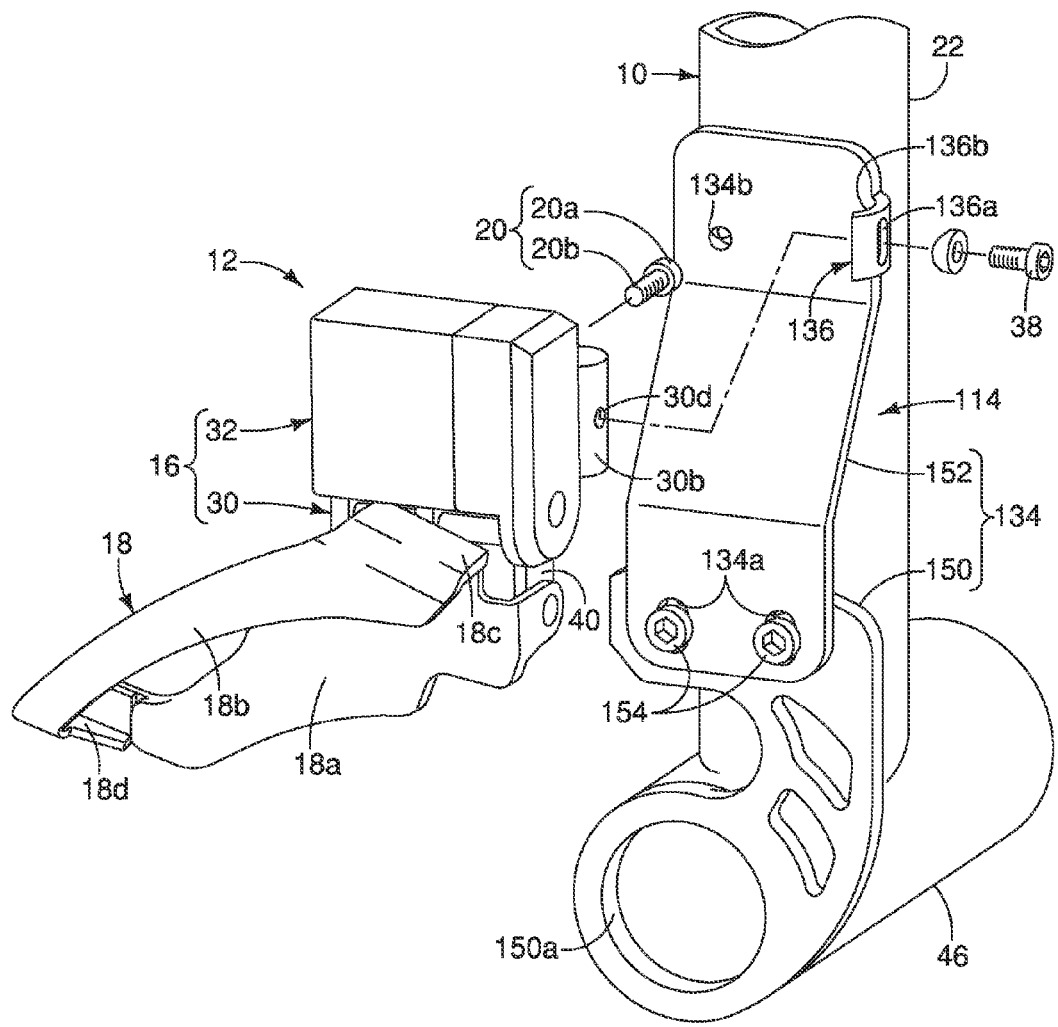
FIG. 8 is an exploded perspective view of the bicycle frame and the front derailleur illustrated in FIG. 7.
Figure 9:
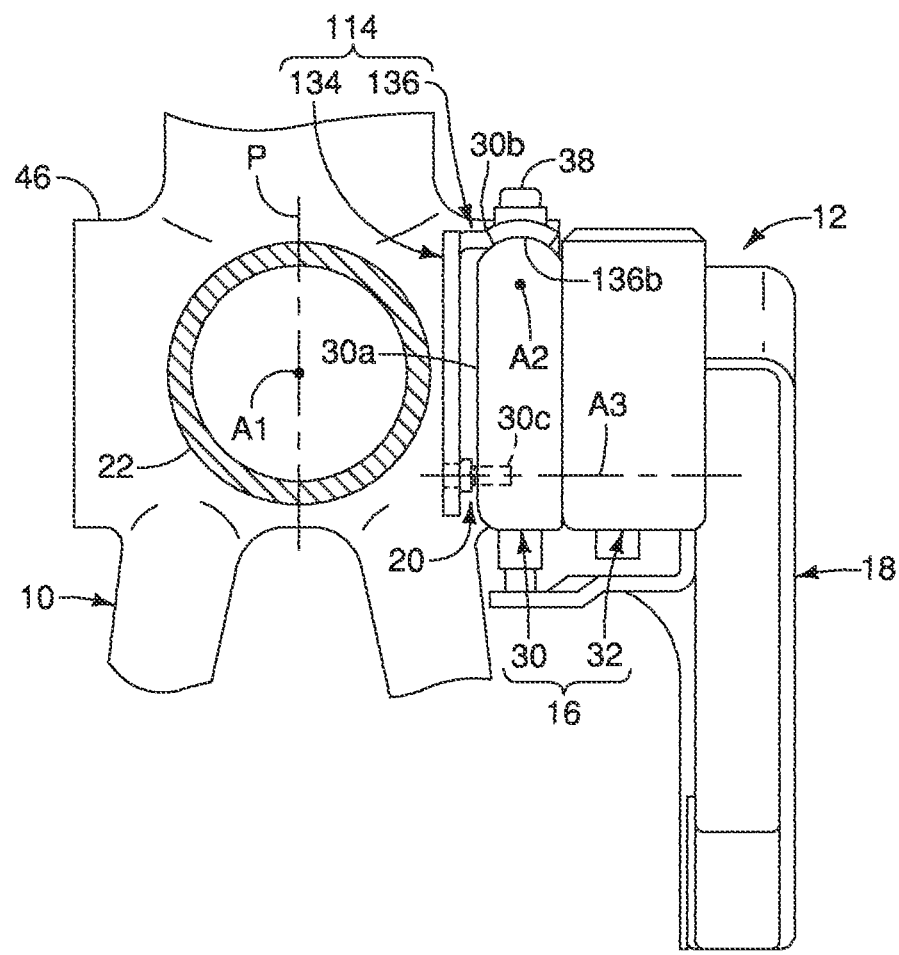
FIG. 9 is a top plan view of the bicycle frame and the front derailleur illustrated in FIGS. 7 and 8.

Referring now to FIGS. 7 to 9, a modified fixing member 114 is illustrated that constitutes a mounting fixture for supporting the front derailleur 12 on the bicycle frame 10. Here in the illustrated embodiment, the fixing member 114 is a bottom bracket mount type of a mounting fixture that is secured to a hanger tube 46. The front derailleur 12 is releasably attached to the fixing member 114 by the derailleur fastener 38. Also the support member 20 is disposed between the front derailleur 12 and the fixing member 114. The support member 20 adjusts the position of the front derailleur 12 relative to the fixing member 114 in the same way as discussed above with respect to the fixing member 14.

Basically, the fixing member 114 includes a bicycle frame attachment portion 134 and a front derailleur attachment portion 136. The bicycle frame attachment portion 134 can be fastened to the hanger tube 46 by a bottom bracket (not shown) in a conventional manner. In this illustrated embodiment of FIGS. 7 to 9, the bicycle frame attachment portion 134 is a two-piece bracket that includes a first member 150 and a second member 152. The first and second members 150 and 152 are rigid member made from a suitable material. The second member 152 is adjustably attached to the first member 150. For example, the second member 152 has two slots 134a for receiving screws 154 that are screwed into threaded holes of the first member 150. The first member 150 has a bottom bracket receiving opening 150a that is configured to be fixed to a bottom bracket of the bicycle frame 10 by a bottom bracket bearing assembly (not shown). The second member 152 is integrally formed with the front derailleur attachment portion 136 as a one-piece, unitary member.

Figure 10:
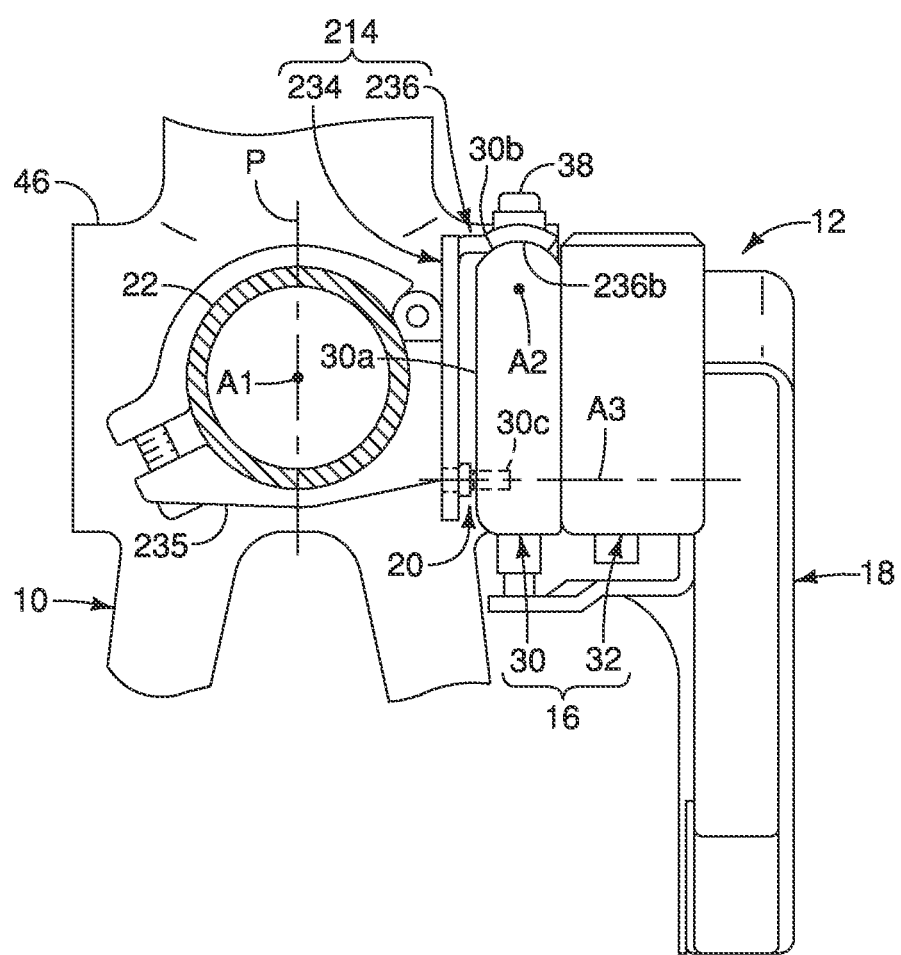
FIG. 10 is a top plain view a bicycle frame having the front derailleur mounted to the frame in accordance with a third embodiment.

Referring to now to FIG. 10, a modified fixing member 214 is illustrated that constitutes a mounting fixture for supporting the front derailleur 12 on the bicycle frame 10. Here in the illustrated embodiment, the fixing member 214 is a clamp type of a mounting fixture that is secured to the seat tube 22. The front derailleur 12 is releasably attached to the fixing member 214 by the derailleur fastener 38 similar to the prior embodiments. Also the support member 20 is disposed between the front derailleur 12 and the fixing member 214. The support member 20 adjusts the position of the front derailleur 12 relative to the fixing member 214 in the same way as discussed above with respect to the fixing members 14 and 114. Basically, the fixing member 214 includes a bicycle frame attachment portion 234 and a front derailleur attachment portion 236. The bicycle frame attachment portion 234 and the front derailleur attachment portion 236 are identical to the bicycle frame attachment portion 34 and the front derailleur attachment portion 36, which are discussed above, except that the upper area including the frame fastener receiving hole 34a has been replaced with a hinged clamp member 235.

Figure 11:
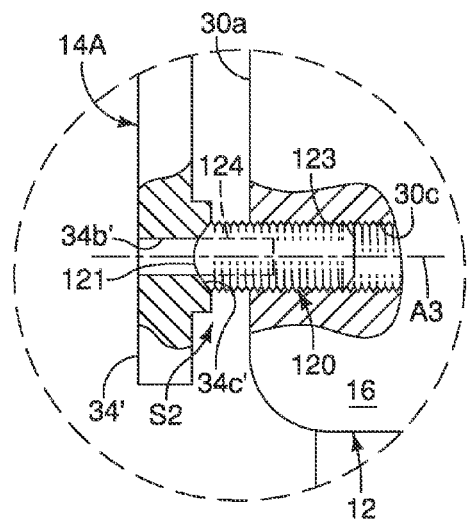
FIG. 11 is a partial top plan view of a portion of the support member and a portion of the main body of the front derailleur illustrated in either FIGS. 1 to 5 or FIGS. 7 to 10 with areas broken away for purposes of illustration of an alternate adjustment structure.

Referring to now to FIG. 11, the front derailleur 12 is provided with a modified support member 120 for adjusting the angular position of the front derailleur 12 relative to a fixing member 14A. The fixing member 14A can be a direct-mount type of a mounting fixture such as illustrated in FIGS. 1 to 6, or a bottom bracket mount type of a mounting fixture such as illustrated in FIGS. 7 to 9, or a clamp type of a mounting fixture such as illustrated in FIG. 10. As seen in FIG. 11, the fixing member 14A has the same configuration as any one of the fixing members 14, 114 and 214, except for the illustrated modification of the bicycle frame attachment portion. Here, as illustrated, the fixing member 14A has a bicycle frame attachment portion 34' having an access opening 34b' and a curved surface 34c', which surrounds the access opening 34b'. The rest of the fixing member 14A will not be illustrated herein, since the rest of the fixing member 14A can have a configuration that is the same as any one of the fixing members 14, 114 and 214.

The support member 120 differs from the support member 20 in that the support member 120 does not include a head portion, and in that the support member 120 has a contact part 121 in the form of a partially spherical surface. The curved surface 34c' of the fixing member 14A mates with the partially spherical surface of the contact part 121. The support member 120 includes a threaded part or shaft portion 123 that is screwed into the threaded hole 30c of the facing surface 30a of the main body 16 to change the pressing force of the support member 120 against the bicycle frame attachment portion 34' of the fixing member 14A. The support member 120 further includes an operated portion 124 that has opening in the partially spherical surface of the contact part 121 and is disposed in a space S2 between the fixing member 14A and the main body 16. The operated portion 124 is illustrated as a blind bore or recess that is shaped to receive a hexagon wrench or other tool.

The support member 120 only is adjustably accessible from the facing surface side 30a of the main body 16 via the access opening 34b' of the bicycle frame attachment portion 34' of the fixing member 14A. Thus, a tool (e.g., a hexagon wrench) is inserted through the access opening 34b' to access the operated portion 124 of the support member 120. In particular, the access opening 34b' is aligned with the operated portion 124 so that a tool can be inserted through the access opening 34b' and into engagement with the operated portion 124 to rotate the support member 120.

Figure 12:
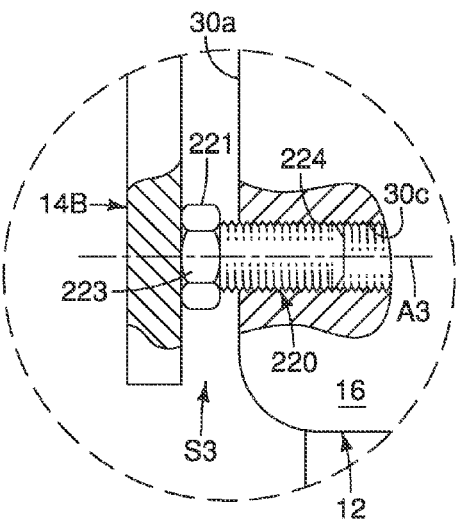
FIG. 12 is a partial top plan view of a portion of the support member and a portion of the main body of the front derailleur illustrated in either FIGS. 1 to 5 or FIGS. 7 to 10 with areas broken away for purposes of illustration of another alternate adjustment structure.

Referring to now to FIG. 12, the front derailleur 12 is provided with a modified support member 220 for adjusting the angular position of the front derailleur 12 relative to a fixing member 14B. Here, the fixing member 14B can be a direct-mount type of a mounting fixture such as illustrated in FIGS. 1 to 6, or a bottom bracket mount type of a mounting fixture such as illustrated in FIGS. 7 to 9, or a clamp type of a mounting fixture such as illustrated in FIG. 10. As seen in FIG. 12, the fixing member 14B has the same configuration as any one of the fixing members 14, 114 and 214, except for the illustrated modification of the bicycle frame attachment portion. In particular, the only difference in the fixing member 14B from the prior embodiments is that the access opening is not included in the fixing member 14B. Of course, the support member 220 can be used with the fixing members 14, 114 and 214 without modifying the fixing members 14, 114 and 214. The rest of the fixing member 14B will not be illustrated herein, since the rest of the fixing member 14B can have a configuration that is the same as any one of the fixing members 14, 114 and 214.

Here in FIG. 12, the support member 220 differs from the support member 20 in that the support member 220 includes a head portion 221 that is configured to be turned by inserting a tool (e.g. a wrench) or a hand/fingers of user in the space S3 between the facing surface side 30a of the main body 16 and the surface of the fixing member 14B that faces the facing surface side 30a of the main body 16. In particular, the head portion 221 includes an operated portion 223 in the form of a non-circular peripheral surface. In other words, the non-circular peripheral surface of the head portion 221 forms the operated portion 223 as a tool engagement surface. Here, the operated portion 223 has a hexagonal shape that is configured to be engaged by a conventional open-end wrench. The support member 220 further includes a threaded part or shaft portion 224 that is screwed into the threaded hole 30c of the facing surface 30a of the main body 16 to change the pressing force of the support member 220 against the fixing member 14B. The support member 220 only is adjustably accessible from the facing surface side 30a of the main body 16 via the space S3 between the facing surface side 30a and the fixing member 14B. Thus, a tool (e.g., an open-end wrench) is inserted in the space S3 to access the operated portion 223 of the support member 220 for engaging and rotating the support member 220.

Figure 13:
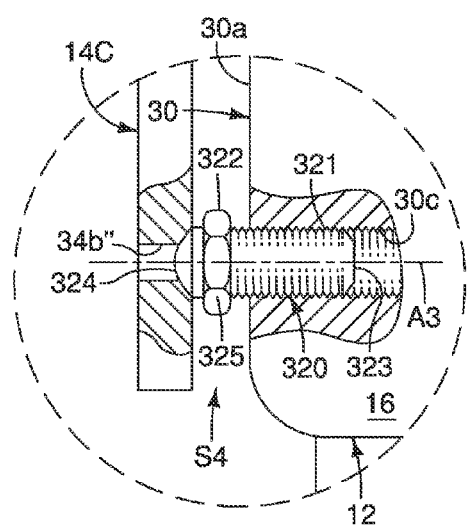
FIG. 13 is a partial top plan view of a portion of the support member and a portion of the main body of the front derailleur illustrated in either FIGS. 1 to 5 or FIGS. 7 to 10 with areas broken away for purposes of illustration of a still another alternate adjustment structure.

Referring to now to FIG. 13, the front derailleur 12 is provided with a modified support member 320 for adjusting the angular position of the front derailleur 12 relative to a fixing member 14C. Here, the fixing member 14C can be a direct-mount type of a mounting fixture such as illustrated in FIGS. 1 to 6, or a bottom bracket mount type of a mounting fixture such as illustrated in FIGS. 7 to 9, or a clamp type of a mounting fixture such as illustrated in FIG. 10. As seen in FIG. 13, the fixing member 14C has the same configuration as any one of the fixing members 14, 114 and 214, except for the illustrated modification of the bicycle frame attachment portion. In particular, the only difference in the fixing member 14C from the prior embodiments is that the access opening is not included in the fixing member 14C. Of course, the support member 320 can be used with the fixing members 14, 114 and 214 without modifying the fixing members 14, 114 and 214. The rest of the fixing member 14C will not be illustrated herein, since the rest of the fixing member 14C can have a configuration that is the same as any one of the fixing members 14, 114 and 214.

Here in FIG. 13, the support member 320 differs from the support member 20 in that the support member 320 includes a shaft portion 321 having a flange portion 322. The shaft portion 321 and the flange portion 322 are formed as a one-piece, unitary member such that the shaft portion 321 and the flange portion 322 move as a unit. The shaft portion 321 has a first axial end 323 and a second axial end 324. The flange portion 322 is arranged between the first axial end 323 and the second axial end 324. The flange portion 322 defines an operated portion 325 for rotating the shaft portion 321. The flange portion 322 is configured to be turned by inserting a tool (e.g. a wrench) or a hand/fingers of user in the space S4 between the facing surface side 30a of the main body 16 and the surface of the fixing member 14C that faces the facing surface side 30a of the main body 16. In particular, the operated portion 325 is in the form of a non-circular peripheral surface. In other words, the non-circular peripheral surface of the flange portion 322 forms the operated portion 325 as a tool engagement surface. Here, the operated portion 325 has a hexagonal shape that is configured to be engaged by a conventional open-end wrench. The shaft portion 321 includes a threaded part that is screwed into the threaded hole 30c of the facing surface 30a of the main body 16 to change the pressing force of the support member 320 against the fixing member 14C. The support member 320 only is adjustably accessible from the facing surface side 30a of the main body 16 via the space S4 between the facing surface side 30a and the fixing member 14C. Thus, a tool (e.g., an open-end wrench) is inserted in the space S4 to access the operated portion 325 of the support member 320 for engaging and rotating the support member 320.

Figure 14:
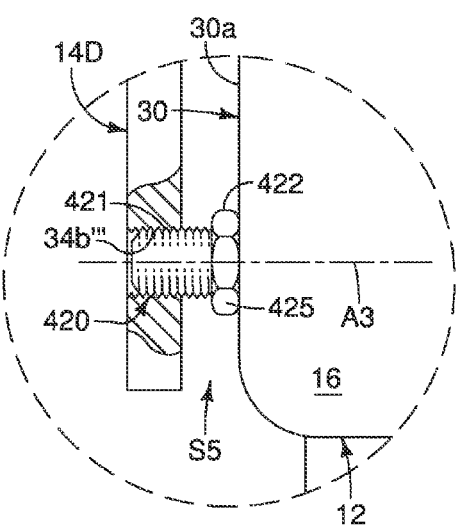
FIG. 14 is a partial top plan view of a portion of the support member and a portion of the main body of the front derailleur illustrated in either FIGS. 1 to 5 or FIGS. 7 to 10 with areas broken away for purposes of illustration of a yet still another alternate adjustment structure.

Referring to now to FIG. 14, the front derailleur 12 is provided with a modified support member 420 for adjusting the angular position of the front derailleur 12 relative to a fixing member 14D. Here, the fixing member 14D can be a direct-mount type of a mounting fixture such as illustrated in FIGS. 1 to 6, or a bottom bracket mount type of a mounting fixture such as illustrated in FIGS. 7 to 9, or a clamp type of a mounting fixture such as illustrated in FIG. 10. As seen in FIG. 14, the fixing member 14D has the same configuration as any one of the fixing members 14, 114 and 214, except for the illustrated modification of the bicycle frame attachment portion. In particular, the only difference in the fixing member 14D from the prior embodiments is that the access opening is not included in the fixing member 14D. The rest of the fixing member 14D will not be illustrated herein, since the rest of the fixing member 14D can have a configuration that is the same as any one of the fixing members 14, 114 and 214.

Here in FIG. 14, the support member 420 differs from the support member 20 in that the support member 420 includes a shaft portion 421 having a flange portion 422. The shaft portion 421 and the flange portion 422 are formed as a one-piece, unitary member such that the shaft portion 421 and the flange portion 422 move as a unit. The flange portion 422 defines an operated portion 425 for rotating the shaft portion 421. The flange portion 422 is configured to be turned by inserting a tool (e.g. a wrench) or a hand/fingers of user in the space S5 between the facing surface side 30a of the main body 16 and the surface of the fixing member 14D that faces the facing surface side 30a of the main body 16. In particular, the operated portion 425 is in the form of a non-circular peripheral surface. In other words, the non-circular peripheral surface of the flange portion 422 forms the operated portion 425 as a tool engagement surface. Here, the operated portion 425 has a hexagonal shape that is configured to be engaged by a conventional open-end wrench. The shaft portion 421 includes a threaded part that is screwed into a threaded hole 34b''' of the fixing member 14D to change the pressing force of the support member 420 against the facing surface 30a of the main body 16. The support member 420 only is adjustably accessible from the facing surface side 30a of the main body 16 via the space S5 between the facing surface side 30a and the fixing member 14D. Thus, a tool (e.g., an open-end wrench) is inserted in the space S5 to access the operated portion 425 of the support ember 420 tier engaging and rotating the support member 420

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. Also it will be understood that although the terms first and second may be used herein to describe various components these components should not be limited by these terms. These terms are only used to distinguish one component from another. Thus, for example, a first component discussed above could be termed a second component and vice-a-versa without departing from the teachings of the present invention. The foregoing also applies to words having similar meanings such as the terms, "including", "having" and their derivatives. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired so long as they do not substantially affect their intended function.

Although a four bar linkage is used in the illustrated embodiment, as discussed above, the movable member 18 can be connected to the base member 30 with other coupling arrangements. In other words, the front derailleur 12 can be configured to have a coupling arrangement which is constructed with a single link member, or which is constructed with more than two link members. Thus, the present invention can be used with electric front derailleurs that use other types of coupling arrangements.

Also components that are shown directly connected or contacting each other can have intermediate structures disposed between them, unless specifically stated otherwise. The functions of one element can be performed by two, and vice versa, unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A front derailleur comprising:
   a fixing member configured to be fixed to a bicycle frame, the fixing member having a first facing surface;
   a main body attached to the fixing member, the main body having a second facing surface arranged facing the first facing surface such that a gap exists between the first facing surface and the second facing surface;
   a movable member movably supported to the main body with respect to the fixing member; and
   a support member movably attached to one of the fixing member and the main body, the support member including an operated portion selectively operated by an operating element and positioned in the gap between the first facing surface and the second facing surface.

2. The front derailleur according to claim 1, wherein the fixing member has an attachment portion, and the main body is adjustably attached to the attachment portion.

3. The front derailleur according to claim 2, wherein the attachment portion includes a curved surface that contacts a curved surface of the main body to define an adjustment axis about which the main body moves relative to the fixing member upon adjustment of the support member.

4. The front derailleur according to claim 3, wherein the support member is movably attached to the main body and defines a displacement axis that is perpendicularly arranged relative to the adjustment axis to adjust an angular position of the main body about the adjustment axis.

5. A front derailleur comprising:
   a fixing member configured to be fixed to a bicycle frame;
   a main body attached to the fixing member;
   a movable member movably supported to the main body with respect to the fixing member; and
   movably attached to the main body, the support member including an operated portion selectively operated by a tool and positioned facing the fixing member between the fixing member and the main body,
   the fixing member having a tool access opening through which the tool is passed to access the operated portion of the support member, the tool access opening passing through the fixing member toward the main body.

6. The front derailleur according to claim 1, wherein the support member includes a contact part that contacts the other of the main body and the fixing member, and a threaded part that is screwed into the one of the main body and the fixing member.

7. The front derailleur according to claim 6, wherein the contact part of the support member contacts the fixing member, and
the threaded part is screwed into the main body.

8. A front derailleur comprising:
a fixing member configured to be fixed to a bicycle frame;
a main body attached to the fixing member;
a movable member movably supported to the main body with respect to the fixing member; and
a support member movably attached to one of the fixing member and the main body, the support member including
an operated portion formed on an axial end face of the support member, the operated portion being disposed between the fixing member and the main body and configured to be selectively operated by a tool, and
a contact part that contacts the other of the fixing member and the main body,
a threaded wart that is c d into the one of the main body and the fixing member,
the other of the main body and the fixing member having a tool access opening that passes there-through and is aligned with the operated portion to rotate the support member by using the tool through the access opening.

9. The front derailleur according to claim 6, wherein the support member includes a head portion that defines the contact part and the operated portion, and a shaft portion that defines the threaded part.

10. The front derailleur according to claim 9, wherein the head portion includes a non-circular peripheral surface that forms the operated portion as a tool engagement surface.

11. The front derailleur according to claim 6, wherein the support member includes a shaft portion that has a first axial end and a second axial end, and a flange portion that is arranged between the first axial end and the second axial end,
the flange portion defines the operated portion, and
the shaft portion at least partially defines the threaded part.

12. The front derailleur according to claim 11, wherein one of the first and second axial ends of the shaft portion defines the contact part.

13. The front derailleur according to claim 11, wherein the flange portion is selectively operated by a tool and includes a non-circular peripheral surface that forms the operated portion as a tool engagement surface.

14. The front derailleur according to claim 6, wherein the contact part of the support member is a partially spherical surface, and
the other of the main body and the fixing member includes a curved surface that mates with the partially spherical surface of the contact part.

15. The front derailleur according to claim 1, wherein the main body includes a base member and a motor unit operatively coupled to the movable member.

16. The front derailleur according to claim 15, wherein the support member movably attached to the base member of the main body.

17. The front derailleur according to claim 1, wherein the fixing member includes a frame fastener receiving hole that receives a fastener to selectively fix the fixing member to a seat tube of the bicycle frame.

18. The front derailleur according to claim 17, wherein the frame fastener receiving hole is an elongated hole that extends perpendicularly relative to the fastener.

19. The front derailleur according to claim 1, wherein the fixing member includes a frame attachment portion having a through opening configured to be aligned with a bottom bracket opening of a bottom bracket shell of the bicycle frame.

20. The front derailleur according to claim 1, wherein the fixing member includes a clamp member attached to the bicycle frame.

21. The front derailleur according to claim 5, wherein the tool access opening passes through the fixing member in a direction perpendicular to a center plane of the bicycle frame while the front derailleur is installed on the bicycle frame, the center plane extending in a vertical direction and a longitudinal direction of the bicycle frame.

22. The front derailleur according to claim 8, wherein the tool access opening passes through the fixing member in a direction perpendicular to a center plane of the bicycle frame while the front derailleur is installed on the bicycle frame, the center plane extending in a vertical direction and a longitudinal direction of the bicycle frame.

* * * * *